US007133950B2

(12) United States Patent
Olukotun (10) Patent No.: US 7,133,950 B2
(45) Date of Patent: Nov. 7, 2006

(54) REQUEST ARBITRATION IN MULTI-CORE PROCESSOR

(75) Inventor: Kunle A. Olukotun, Stanford, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 148 days.

(21) Appl. No.: 10/855,060

(22) Filed: May 26, 2004

(65) Prior Publication Data

US 2005/0060457 A1   Mar. 17, 2005

Related U.S. Application Data

(60) Provisional application No. 60/496,602, filed on Aug. 19, 2003.

(51) Int. Cl.
   *G06F 13/36* (2006.01)
(52) U.S. Cl. ........................... 710/240; 710/309
(58) Field of Classification Search ........ 710/240–244, 710/309–315, 110–119, 36–39
   See application file for complete search history.

(56) References Cited

U.S. PATENT DOCUMENTS

| | | | |
|---|---|---|---|
| 5,526,510 A | | 6/1996 | Akkary et al. |
| 5,646,873 A * | | 7/1997 | Shimazawa et al. ........ 708/209 |
| 6,480,927 B1 | | 11/2002 | Bauman |
| 6,529,990 B1 * | | 3/2003 | Kruse et al. ............... 710/310 |
| 6,532,509 B1 | | 3/2003 | Wolrich et al. |
| 6,647,449 B1 * | | 11/2003 | Watts ....................... 710/111 |
| 6,928,500 B1 * | | 8/2005 | Ramanujan et al. ........ 710/107 |
| 2002/0188807 A1 * | | 12/2002 | Chaudhry et al. .......... 711/128 |

FOREIGN PATENT DOCUMENTS

| | | |
|---|---|---|
| JP | 62230718 | 3/1989 |
| WO | WO 03/036482 | 5/2003 |

OTHER PUBLICATIONS

Yuval Tamir et al: "Symmetric Crossbar Arbiters for VLSI Communication Switches" IEEE Transactions on Parallel and Distributed Systems, IEEE Service Center, Los Alamitos, CA, US, vol. 4, No. 1, Jan. 1993, pp. 13-27, XP000381 ISSN:1045-9219.

* cited by examiner

*Primary Examiner*—Mark H. Rinehart
*Assistant Examiner*—Raymond N Phan
(74) *Attorney, Agent, or Firm*—Martine Penilla & Gencarella, LLP (57) ABSTRACT

A processor chip is provided. The processor chip includes a plurality of processing cores, where each of the processing cores are multi-threaded. The plurality of processing cores are located in a center region of the processor chip. A plurality of cache bank memories are included. A crossbar enabling communication between the plurality of processing cores and the plurality of cache bank memories is provided. The crossbar includes an arbiter configured to arbitrate multiple requests received from the plurality of processing cores with available outputs. The arbiter includes a barrel shifter configured to rotate the multiple requests for dynamic prioritization, and priority encoders associated with each of the available outputs. Each of the priority encoders have logic gates configured to disable priority encoder outputs. A method for arbitrating requests within a multi-core multi-thread processor is included.

17 Claims, 7 Drawing Sheets

REQUEST ARBITRATION IN MULTI-CORE PROCESSOR

CROSS REFERENCE TO RELATED APPLICATIONS

This application claims priority from U.S. Provisional Patent Application No. 60/496,602 filed Aug. 19, 2003 and entitled "Web System Swerver Design Specification". This provisional application is herein incorporated by reference.

BACKGROUND OF THE INVENTION

1. Field of the Invention

This invention relates generally to servers and more particularly to a processor architecture and method for serving data to client computers over a network.

2. Description of the Related Art

With the networking explosion brought along with introduction of the Internet, there has been a shift from the single thread desktop applications for personal computers to server applications that have multiple threads for serving multiple clients. Electronic commerce has created a need for large enterprises to serve potentially millions of customers. In order to support this overwhelming demand, the serving applications require different memory characteristics than the memory characteristics for desktop applications. In particular, the serving applications require large memory bandwidth and large cache memory requirements in order to accommodate a large number of clients.

In addition, conventional processors focus on instruction level parallelism. Therefore, the processors tend to be very large and the pipeline is very complex. Consequently, due to the complexity of the pipeline for processors, such as INTEL processors, only one core is on the die. Accordingly, when there is a cache miss or some other long latency event, there is usually a stall that causes the pipeline to sit idle. Serving applications are generally constructed to be more efficient with very little instruction level parallelism per thread. Thus, the characteristics of implementation for conventional processors with the application of serving workloads result in a poor fit since conventional processors focus on instruction level parallelism.

Additionally, the performance of processors based on instruction level parallelism (ILP), as a function of die size, power and complexity, is reaching a saturation point. Conventional ILP processors include well known processors from the PENTIUM™, ITANIUM™, ULTRASPARC™, etc., families. Thus, in order to increase performance, future processors will have to move away from the traditional ILP architecture.

In view of the forgoing, there is a need for a processor having an architecture better suited for serving applications in which the architecture is configured to exploit multi-thread characteristics of serving applications.

SUMMARY OF THE INVENTION

Broadly speaking, the present invention fills these needs by providing a processor having a cache crossbar architecture and arbitration scheme configured to efficiently process server applications. It should be appreciated that the present invention can be implemented in numerous ways, including as an apparatus, a system, a device, or a method. Several inventive embodiments of the present invention are described below.

In one embodiment, a method for arbitrating requests in a multi-core multi-thread processor is provided. The method initiates with issuing a signal indicating arbitration requests to be performed during a cycle for a respective input unit. Then, the signal from the respective input unit is prioritized relative to additional signals for arbitration requests during the cycle from additional input units. In parallel with the prioritizing, one of a plurality of outputs is associated with the respective input unit for one of the arbitration requests. The associating includes determining if the one of the plurality of outputs was previously allocated. If the one of the plurality of outputs was previously allocated, the method includes nullifying the association of the one of the plurality of outputs with the respective input. The associating operation is repeated for remaining arbitration requests. Then, granted arbitration requests for the respective input unit are identified. Next, one of the granted arbitration requests is selected. The signal from the respective input unit is then de-prioritized relative to additional signals from the additional input units.

In another embodiment, a processor chip is provided. The processor chip includes a plurality of processing cores, where each of the processing cores are multi-threaded. A plurality of cache bank memories are included. A crossbar enabling communication between the plurality of processing cores and the plurality of cache bank memories is provided. The crossbar includes an arbiter configured to arbitrate multiple requests received from the plurality of processing cores with available outputs. The arbiter includes a barrel shifter configured to rotate the multiple requests for dynamic prioritization, and priority encoders associated with each of the available outputs. Each of the priority encoders have logic gates configured to disable priority encoder outputs.

In yet another embodiment, a server is provided. The server includes an application processor chip. The application processor chip includes a plurality of processing cores, where each of the processing cores are multi-threaded. A plurality of cache bank memories are included. A crossbar enabling communication between the plurality of processing cores and the plurality of cache bank memories is provided. The crossbar includes an arbiter configured to arbitrate multiple requests received from the plurality of processing cores with available outputs. The arbiter includes a barrel shifter configured to rotate the multiple requests for dynamic prioritization, and priority encoders associated with each of the available outputs. Each of the priority encoders have logic gates configured to disable priority encoder outputs.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a layout configuration for a cache crossbar arbitration architecture for a multi-thread multi-core processor. It will be obvious, however, to one skilled in the art, that the present invention may be practiced without some or all of these specific details. In other instances, well known process operations have not been described in detail in order not to unnecessarily obscure the present invention.

The embodiments described herein define an architecture for multiple simple cores on a chip, where each of the cores have their own first level cache and the cores share a second level cache through a crossbar. Additionally, each of the cores have two or more threads. Through multi-threading, latencies due to memory loads, cache misses, branches, and other long latency events are hidden. In one embodiment, long latency instructions cause a thread to be suspended until the result of that instruction is ready. One of the remaining ready to run threads on the core is then selected for execution on the next clock (without introducing context switch overhead) into the pipeline. In one embodiment, a scheduling algorithm selects among the ready to run threads at each core. Thus, a high throughput architecture is achieved since the long latency event is performed in the background and the use of the central processing unit is optimized by the multiple threads. Therefore, the embodiments described below provide exemplary architectural layouts for handling the bandwidth demanded by the multi-thread multi-core configuration.

A crossbar architecture capable of handling the bandwidth demanded by the multi-thread multi-core architecture is, of course, required. Additionally, as (or more) complex than the crossbar itself, is the low-latency arbitration mechanism necessary to control which "lanes" of the crossbar are allocated to which reference sender on each cycle. While the complexity in the crossbar itself is primarily due to the long wires, the complexity of the arbiter is due to the fact that several large, high-fanin gates are required to process the references. Furthermore, it is very difficult to pipeline the arbitration, because failed arbitrations need to be recycled back into the arbitration process quickly. Discussed below are two possible arbitration algorithms, referred to as parallel-check and 2-D priority encode, as well as a scalable implementation of an arbiter for the parallel-check algorithm. The parallel-check implementation is "scalable" in the sense that arbitration "quality" may be traded off for an implementation with fewer gates. Basic implementation concepts for the 2-D encoder scheme are discussed below also.

Figure 1:
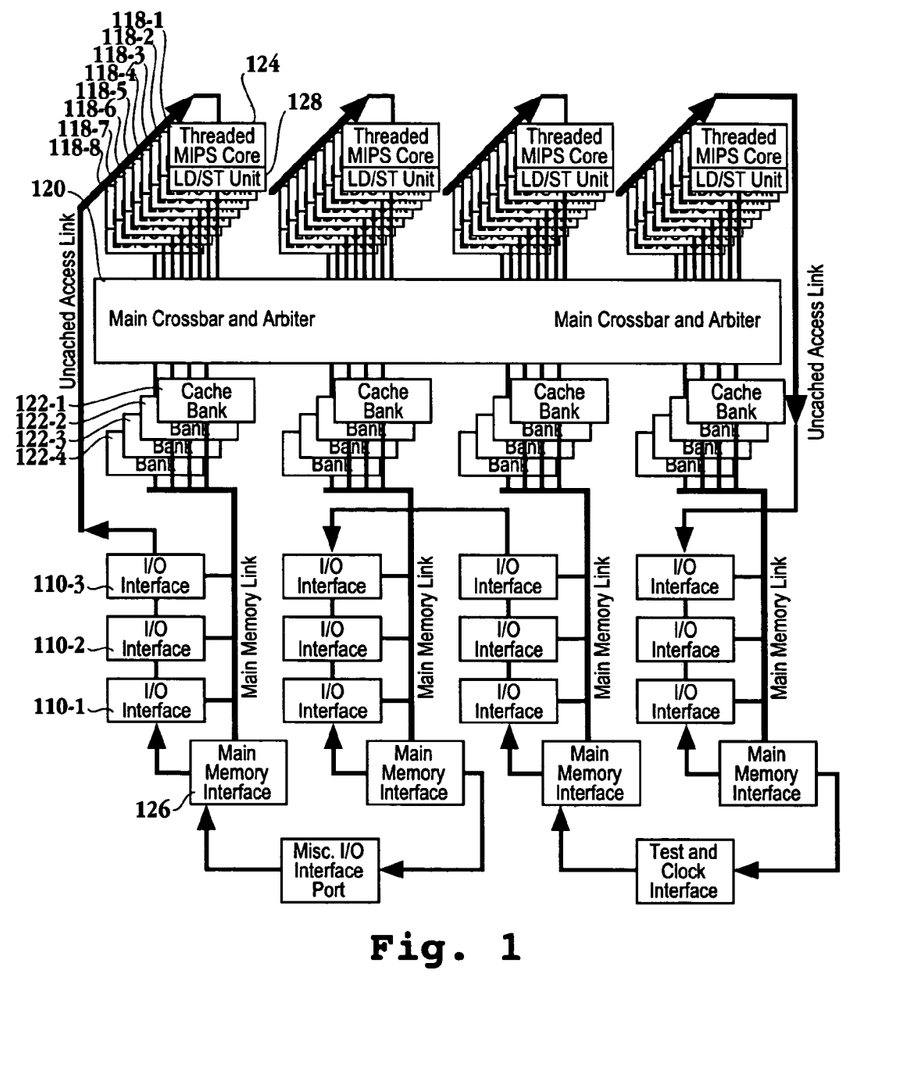
FIG. 1 is a schematic diagram of a processor chip having 4 sets of 8 multi-threaded processor cores in accordance with one embodiment of the invention.

FIG. 1 is a schematic diagram of a processor chip having 4 sets of 8 multithreaded processor cores in accordance with one embodiment of the invention. Threaded cores 118-1 through 118-8 make up the first set of 8 cores of the chip. Each of threaded cores 118-1 through 118-8 include level 1 cache 124. Level 1 cache 124 includes instruction cache (I$) segment and data cache (D$) segment. Load/Store unit 128 is included within each of threaded cores 118-1 through 118-8. It should be appreciated that each of processor cores on the chip include an instruction cache, a data cache and a load store unit. Additionally, processor cores 118-1 through 118-8 are discussed for exemplary purposes, however, the discussion is applicable to all the cores illustrated in FIG. 1. In one embodiment, the load/store unit architecture is similar to that of reduced instruction set computer (RISC) architecture. Of course, the multithreading aspects of the present invention were not accommodated by the RISC architecture. In another embodiment, each of the processor cores are based upon SPARC™ technology of the assignee of the invention. Each processor core 118-1 through 118-8 is in communication with crossbar and arbiter 120. Crossbar 120 is optimized for processor traffic where it is desirable to obtain extremely low latency. Level 2 (L2) cache banks 122-1 through 122-4 are shared by processor cores 118-1 through 118-8. It should be appreciated that by sharing L2 cache banks 122-1 through 122-4 allows for concurrent access to multiple banks at the same time, thereby defining a high bandwidth memory system. In one embodiment, each of L2 cache banks have a size of about 1 megabyte (MB). It should be appreciated that while four L2 cache banks 122-1 through 122-4 are shown in FIG. 1, the invention is not limited to four L2 cache banks. That is, the number of L2 cache banks is sufficient to provide enough bandwidth from the L2 cache to keep all of the threads busy. In one embodiment, each processor core includes 4 threads. Thus, a single processor chip with eight cores will have 32 threads in this configuration. Each L2 cache bank 122-1 through 122-4 is in communication with main memory interface 126 through a main memory link in order to provide access to the main memory. It should be appreciated that while 8 cores are depicted on the processor chip, more or less cores can be included as the FIG. 1 is exemplary and not meant to be limiting.

Still referring to FIG. 1, main memory interface 126 is in communication with input/output (I/O) interface blocks 110-1 through 110-3 which provide uncached access to the threaded cores through the uncached access link. Thus, processor cores 118-1 through 118-8 are enabled to directly access a register in any of I/O devices through I/O interfaces 110-1–110-3 instead of communicating through the memory. It should be appreciated that the I/O interface blocks, main memory interface blocks, miscellaneous I/O interface port block, and test and clock interface block also drive off-chip pins.

Figure 2:
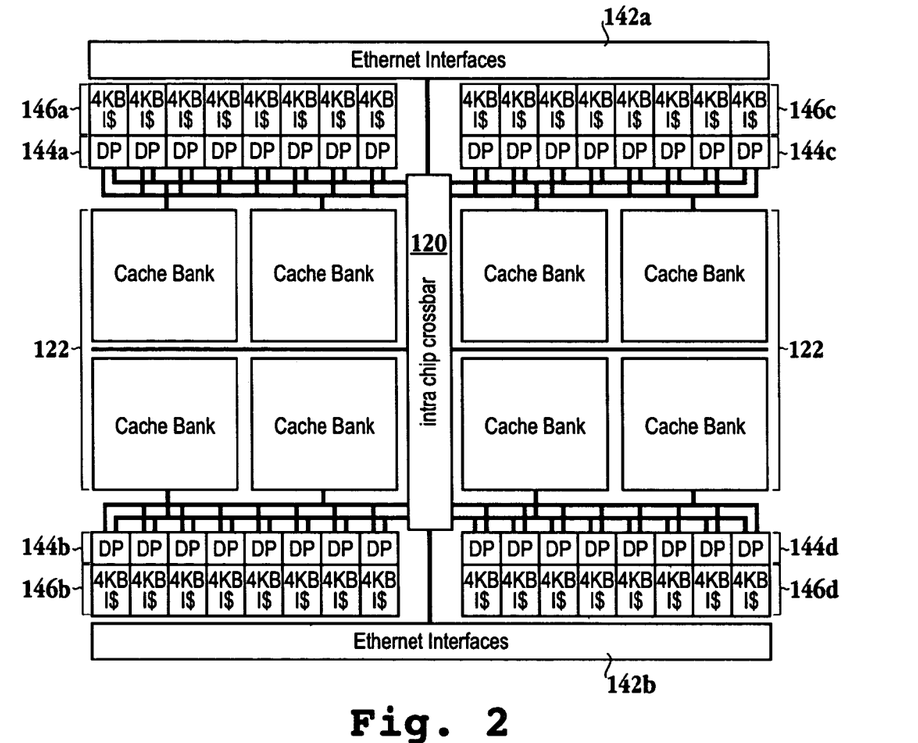
FIG. 2 is an alternative schematic representation of the multi-threaded multi-core processor chip of FIG. 1.

FIG. 2 is an alternative schematic representation of the processor chip of FIG. 1. Here, crossbar 120 is in communication with data pathways 144*a*–144*d*, and L2 cache banks 122. It should be appreciated that only 2 sets of cache banks 122 are shown due to limitations of illustrating this configuration in two dimensions. Two additional cache banks are provided, but not shown, so that each data pathway 144a–144d is associated with a cache bank. Ethernet interfaces 142a and 142b provide access to a distributed network. In one embodiment, Ethernet interfaces 142a and 142b are gigabit Ethernet interfaces. Level one cache memories 146a–146d are provided for each of the processor cores associated with data pathways 144a–144d.

It should be appreciated that the processors of FIGS. 1 and 2 issue approximately 10–12 data memory references per cycle into the main cache memory of the chip, along with the occasional local instruction cache miss. Because of the large number of independent 64-bit accesses that must be processed on each cycle, some sort of crossbar mechanism must be implemented between the individual processors and the 16 independently accessible main cache banks. This logic will utilize many long wires, large multiplexers, and high-drive gates. Making matters worse, it will probably be difficult to efficiently pipeline this huge structure, so large chunks of it will have to operate in a single cycle.

Figure 3:
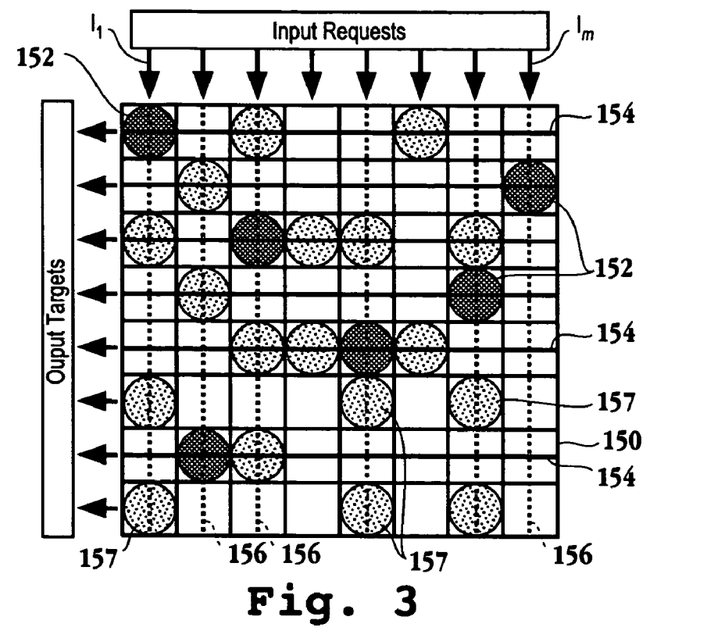
FIG. 3 is a schematic diagram pictorially illustrating the arbitration algorithm for a multi-thread multi-core processor in accordance with one embodiment of the invention.

Arbitration in a system such as the multi-core multi-thread crossbar described herein may be analogized to the classic "8 Queens" problem (actually "N Rooks" in this case). FIG. 3 is a schematic diagram pictorially illustrating the arbitration algorithm for a multi-thread multi-core processor in accordance with one embodiment of the invention. Here, on each cycle the arbiter represented by block 150, must examine M bitvectors, $I_1$ to $I_m$, (one from each of M inputs) of requests that are N bits long (one bit for each possible output). From these inputs, a set of requests must be passed so that each input and output will have no more than one request assigned to the corresponding input and output per cycle. Hence, each successful arbitration represented by solid circles 152 "shadows" and deactivates all requests in the same row (as can be seen by tracing solid lines 154) and all requests in the same column (as can be seen by tracing vertical hashed lines 156). The deactivated requests are represented by non-solid circles 157. This is a fairly complex computation, and is complicated more by the fact that the relative priority between requests from different inputs needs to vary over time to prevent "hogging" of any particular output by an input. The embodiments described below examine several different configuration options (and their key constituent components) for handling the arbitration of the multiple requests from input units.

Figure 4:
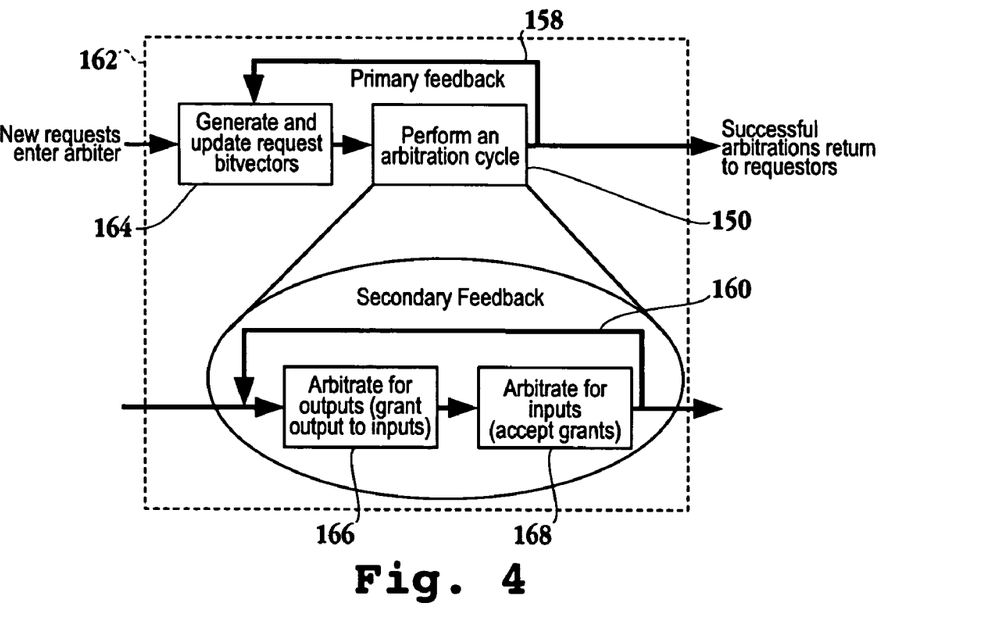
FIG. 4 is a simplified schematic diagram of a hardware configuration of the arbiter having primary and secondary feedback loops in accordance with one embodiment of the invention.

FIG. 4 is a simplified schematic diagram of a hardware configuration of the arbiter having primary and secondary feedback loops in accordance with one embodiment of the invention. Arbiter 162 includes primary feedback loop 158 and secondary feedback loop 160. Module 150 is configured to perform an arbitration cycle. In one embodiment, module 150 performs an arbitration cycle illustrated above with reference to FIG. 3. Here, several arbitrations for outputs, in series (through the short secondary feedback loop shown) and/or in parallel are performed. If multiple arbitrations are performed in parallel, secondary arbitrations occur after each set of parallel arbitrations to ensure that a single input does not get more than one output assigned to the input in a cycle. In one embodiment, outside of arbiter 150 there is logic to maintain the current set of requests and update this set on a cycle-by-cycle basis as arbitrations succeed. This forms a larger, outer feedback loop around arbiter 150 that makes the arbiter as a whole difficult to pipeline as time to deactivate successful requests before they may be fed back into the arbiter again is considered.

Primary feedback loop 160 includes the capability to turn off requests once they succeed so the requests do not re-request. Here, after a successful arbitration is performed, module 164 receives feedback to update request bitvectors in order to turn off the corresponding request. Secondary feedback loop 160 includes modules 166 and 168. Module 166 performs the function of arbitrating for outputs, i.e., granting outputs to inputs. Module 168 receives the output from module 166 and performs the function of arbitrating for inputs, i.e., accepting grants. Secondary feedback loop 160 is configured to feed each arbitration through the arbiter multiple times to improve arbitration efficiency. In one embodiment, the arbiter will be configured to reassign outputs to second choice inputs when the first choice inputs get multiple output grants at once and can not use all of the output grants.

One exemplary arbitration algorithm, the parallel-check algorithm, is described below. This algorithm attempts to minimize the number of passes through the secondary feedback loop of FIG. 4 for each arbitration by performing most of the algorithm's priority encoding in parallel. Inputs compete to see which one is to get access to which output during a particular cycle. Later, if an input happens to get more than one output successfully, the input selects which of the successful output arbitrations will actually be used during that cycle. Because some potential arbitrations may be discarded during the second half of the process, multiple stages of these two steps may then execute serially, so that any inputs that came up empty during the first half of the previous stage are allowed to compete again for any arbitrations that were discarded by a multiple winner during the second half of the previous stage. It should be appreciated that each of the two halves of any arbitration stage require large priority encoders and control logic with large numbers of inputs and outputs.

Figure 5A:
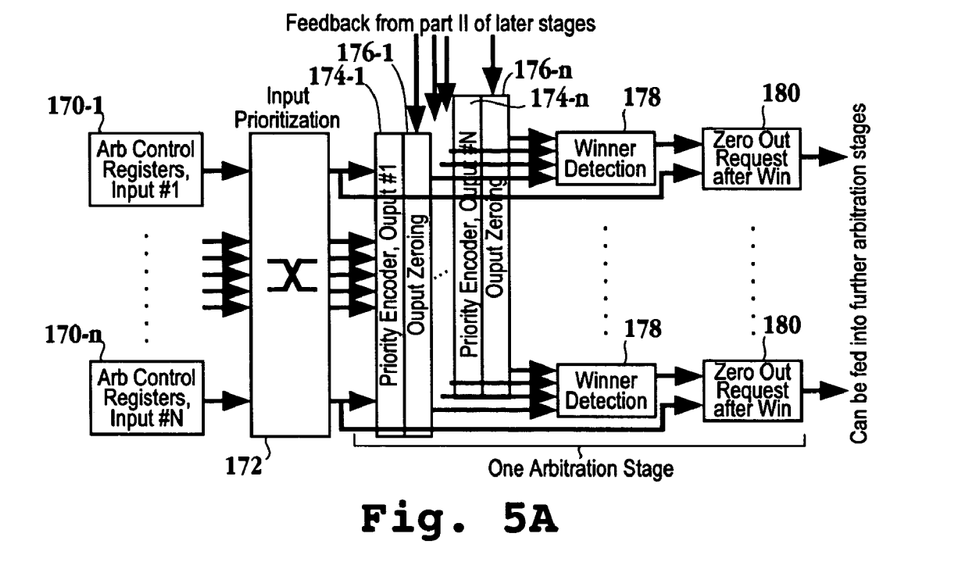
FIGS. 5A and 5B illustrate an exemplary layout of the modules representing the logical design of a crossbar arbiter in accordance with one embodiment of the invention.
Figure 5B:
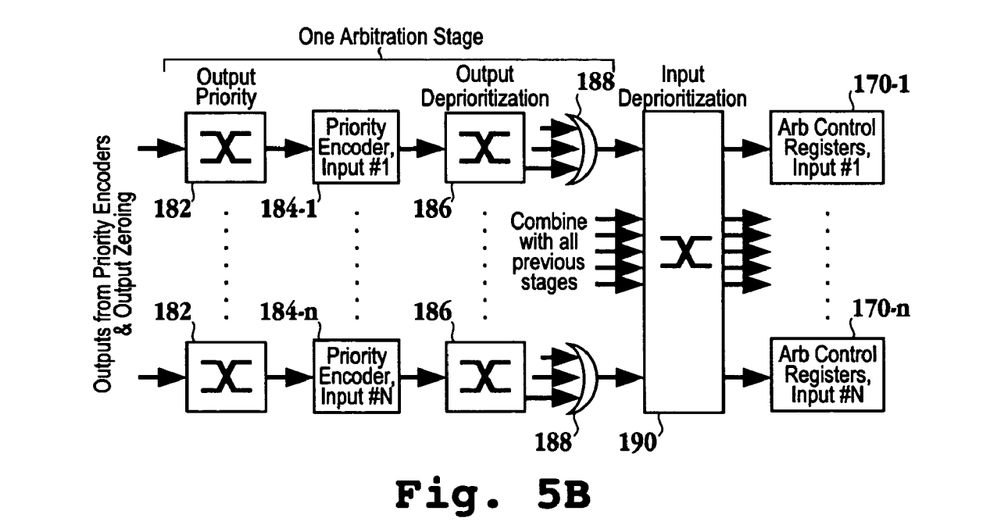

This two-stage arbitration algorithm can be broken down into complex, but buildable logic that completes the following steps, as depicted in FIGS. 5A and 5B, which are schematic diagrams representing the logical design of a crossbar arbiter in accordance with one embodiment of the invention. FIG. 5A represents the arbitration for outputs, while FIG. 5B represents arbitration for inputs. The steps illustrating the algorithm are as follows: 1) Input units 170-1 through 170-n send a bitvector, signaling all arbitrations that the input units would like to perform this cycle, to input prioritization module 172 of the arbiter. 2) Input prioritization module 172 of the arbiter prioritizes the inputs so that each input has a varying priority to all of the different outputs. In one embodiment, this priority is dynamically changed over time so that each input will have varying priority to any particular output, thereby making it difficult for any one input to hog access to one output. 3) In parallel, each output selects an input to access. Here, priority encoders 174-1 through 174-n for each output arbitrate for inputs 1 through n, respectively. 4) It should be appreciated that if the output has already been allocated during a previous arbitration stage, then all selections from the previous step may be nullified to prevent double assignments. 5) All inputs may check to see if the inputs have won any arbitrations during this stage through winner detection modules 178. 6) If an input has won any arbitrations, associated requests of the input are nullified through module 180 before the requests pass into later stages of arbitration, resulting in the request removing itself from the competition during later stages.

Still referring to FIGS. 5A and 5B, in step 7), the parallel output selection of an input discussed above in step 3), may be dynamically prioritized through output priority modules 182 for each input. Therefore, each input will not favor any particular output when the input happens to get multiple outputs on any particular cycle. 8) Each input selects which arbitration it will actually keep, if the input has successfully made several arbitrations at once. This functionality is performed through blocks 178 and 180. 9) Data rearrangement from the prioritization in step 7) is undone through output de-prioritization blocks 186. 10) For all stages after the first, the signals indicating that an output has been successfully arbitrated is combined with the success signals from earlier stages before continuing. 11) Steps 3–10 are repeated for each additional desired stage. 12) Data rearrangement from the prioritization in step #2 is completed through input de-prioritization module 190. 13) Successful arbitrations are sent back to the sending units.

It should be appreciated that while steps 3–10 form the heart of each arbitration stage, steps 3–10 do not all have to be performed serially. Because of the dataflow patterns, steps 5–6 and then 3 (of the next stage) can occur in parallel with steps 7–10 (in one embodiment, the arbitration nullification performed in step 4 logically occurs before step 3, but it can safely be moved afterwards in order to improve parallelism). Steps 4 and 10 may be omitted from the first stage, since they are responsible for carrying forward information generated by earlier stages. Similarly, steps 5–6 may be eliminated from the final stage, since they are responsible for preparing for the next stage. If a single-stage arbiter is built, all four of these parts, i.e., steps 4–6 and 10, may be eliminated from the single stage.

As a result of the complicated circuitry for the arbiter, many simplifications may be necessary in order to allow the critical path of the arbiter to fit within the time allotment allowed. Below are listed potential suggestions that may be implemented to simplify the circuitry:

Minimize staging: One simplification is to limit the number of arbitration stages. This will result in a less "optimal" arbitration, with some outputs going unused simply because they were allocated to an input that got multiple arbitrations at once, and therefore couldn't use all of them. However, one skilled in the art will appreciate this may not be an issue.

Pushed-out First-Half Shift: The prioritization shift in steps 2 and 12 described above may be "pushed out" of the critical primary feedback path of the arbiter by moving at least a small part of the arbitration control registers. The small part of the arbitration control registers is enough to control feedback from one arbitration cycle to the next inside of the shifters. Thus, the shifters can work on the cycle just before and after each arbitration. The design of these split registers is disclosed further below. This makes the design of the arbitration control registers somewhat more difficult, however a fair amount of logic can be eliminated from the critical path to more than offset the arbitration design implications.

Eliminate prioritization: One or both of the dynamic prioritization passes may be eliminated if it is considered acceptable to have fixed priorities for inputs or outputs. In one embodiment, the prioritization pass for the second half of FIG. 5B of each stage (discussed with reference to steps 7 and 9 above) is eliminated, while the prioritization for the first half of FIG. 5A (steps 2 and 12) remains. The elimination of the prioritization pass from the second half does not negatively impact the arbitration scheme because it only affects the selection of arbitrations following a "multiple success" arbitration by any one input. Furthermore, this priority won't necessarily be "fixed" here, even if it is fixed in hardware, because the first-half shifter will force different inputs to use different second-half priority encoders, although there will be a locked priority-to-priority relationship. In contrast, eliminating the first prioritization pass would lock the arbiter into a fixed input-to-output priority, making it easier for a single input to hog all of the bandwidth to its favored output(s). As a result, using the "push-out" technique described above would be a better idea with this shifter.

Figure 6:
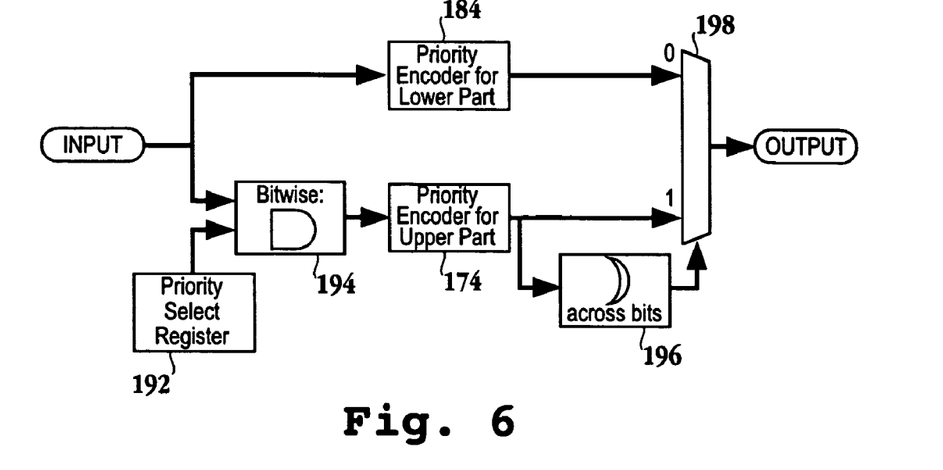
FIG. 6 represents a hardware alternative that may replace the shifter/priority encoder/shifter pattern of FIGS. 5A and 5B.

Combine prioritization and priority encoding: A piece of hardware illustrated in FIG. 6 may replace the shifter ? priority encoder ? shifter pattern of FIGS. 5A and 5B. Here, the shifter ? priority encoder ? shifter pattern can be replaced by a pair of parallel priority encoders represented by modules 184 and 174 and some control logic for coordination. The control logic includes bitwise AND gate of module 194, bitwise OR gate of module 196 and multiplexer 198. For example, where it is found that prioritization is desirable but the shifters are just too difficult to implement, the configuration illustrated by FIG. 6 would be a suitable alternative. This structure could also be used to merge the first-half shifters from steps 2 and 12 into the priority encoder in step 3. In one embodiment, it may be easier just to use a pushed-out shifter design, instead, especially in a multi-stage arbiter. Priority select register module 192 contains the current priority shift encoded as (N-shift) 1's in the high bits of the word. For example, with an 8 bit priority, the priorities, <msb-to-lsb> where msb is the most significant bit and lsb is the least significant bit, are tabulated below in TABLE 1:

TABLE 1

| Priority | Register |
|----------|----------|
| 0 | 11111111 |
| 1 | 11111110 |
| 2 | 11111100 |
| 3 | 11111000 |
| 4 | 11110000 |
| 5 | 11100000 |
| 6 | 11000000 |
| 7 | 10000000 |

Alternating and pipelined-request arbitration: The cycle time of the arbiter is set by the feedback loop requests, arbitration, update request list, etc. Essentially, the success or failure of the requests made by any particular input on any particular arbitration cycle is required to generate the next set of requests from the input. Otherwise, the input may re-request an output that it just received. This feedback loop normally makes the arbiter unpipelinable, which forces the already complex logic to work in a single cycle. However, the allowed arbitration time may be extended out to N cycles in a few alternative schemes described below.

The simplest technique is to allow any particular input to only arbitrate for outputs every $N^{th}$ cycle. This limits the bandwidth available to any particular input to 1/N of the original bandwidth, but allows the arbiter (and the crossbar itself) to physically be much smaller, since N inputs can share the same hardware in an alternating fashion.

The most complicated technique is to have each input segregate its requests into N "buckets" of generic requests. Each bucket of requests is only allowed to send its collection of requests every $N^{th}$ cycle, giving the arbiter N cycles to update the request list in any particular bucket before those requests may try again. If new requests are always inserted in the bucket at the head of the line, this will result in a system that only lengthens the arbitration time for accesses that must retry. This will have the effect of magnifying the arbitration delay when banks are highly contested, and will also allow sequences of memory requests to a particular cache bank to go out-of-order, even if they all hit in the cache.

In between these two extremes is a system that has request "buckets" like the complex scheme, but sorts the accesses that it puts into each bucket by output number. This will cause each input to only arbitrate for one particular, alternating subset of the outputs every $N^{th}$ cycle. Like the alternating-inputs technique, it will allow the arbiter to be physically simplified, at the expense of limiting bandwidth for each input, but only if an input happens to have most of its requests made to a single output group.

Figure 7:
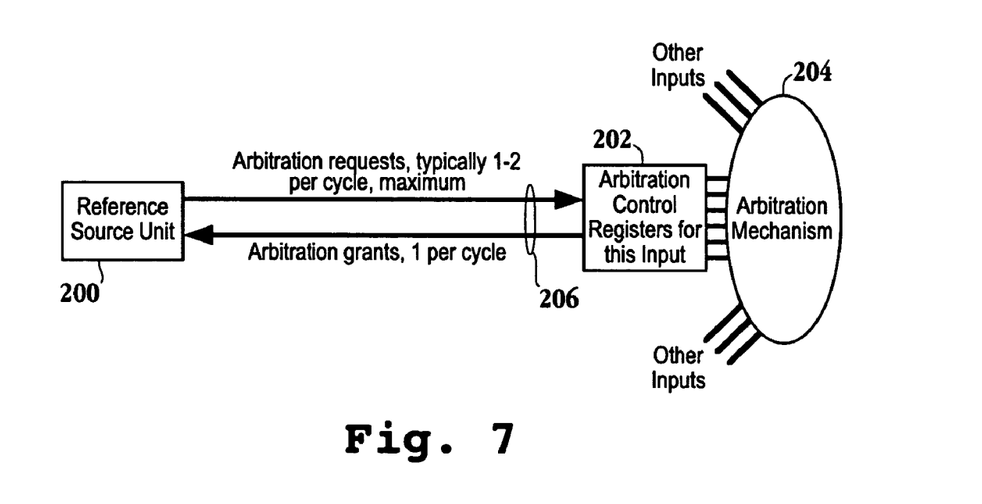
FIG. 7 is a schematic diagram of the interface between the arbitration mechanism and the requesting units in accordance with one embodiment of the invention.

An exemplary architecture configured to implement the parallel check algorithm is described below. FIG. 7 is a schematic diagram of the interface between the arbitration mechanism and the requesting units in accordance with one embodiment of the invention. The first part of each arbiter is not actually the arbiter itself, but its connection to the units that are making requests for it to process, as is depicted in FIG. 7. In order to allow a fairly short communication time between arbitration mechanism 204 and the list of pending requests from each unit, this list is maintained in a set of arbitration control registers physically located adjacent to the arbiter, such as arbitration control register 202. Between the unit and the arbitration control lists are small sets of wires 206 that transmit new arbitration requests from source unit 200 as the requests are generated. It should be appreciated that source unit 200 may be the LD/ST units, cache banks, or intermediate buffers illustrated in FIGS. 1 and 2. These requests will typically be encoded as an output number and the length of the arbitration required (for synchronization instructions and instruction cache fetches). Since each unit 200 typically produces one or two references per cycle, this connection does not need to be large, even though each unit may have numerous references queued up waiting for arbitration. The return path is similarly narrow, but will typically only need to handle one reference per cycle, since each unit will typically only be able to send one reference per cycle. This interface link architecture allows the high-bandwidth connection between the full request queues and the arbiter core to be very short, while longer wires 206 to various reference-handling units 200 are minimized and used effectively.

In the arbiter itself, there will be logic that performs the tasks laid out above in one embodiment. The following list summarizes how the different steps described above translate into logic gates. It should be noted that numbers 1–13 correspond to steps 1–13 described above with reference to FIGS. 5A and 5B.

1. A register provides the requests.
2. A barrel shifter rotates the requests to prioritize them.
3. Priority encoders for each output arbitrate for inputs.
4. AND gates can disable priority encoder outputs if necessary.
5. Successful arbitrations can be detected using an OR across the priority encoder outputs for a particular input. Any successful arbitration, whether or not there are multiple successful arbitrations, will result in this signaling true.
6. Another line of AND gates can disable the requests from an input once it has won an arbitration.
7. The second prioritization should also be done with a barrel shifter.
8. The output arbitration is done with a priority encoder for each input.
9. Un-prioritization is also done with a barrel shifter.
10. OR gates are used to combine outputs from previous stages.
11. Repeat steps 3–10 for each additional desired stage.
12. Un-prioritization is also done with a barrel shifter.
13. Successful arbitrations are used to update the contents of the registers that provide requests. This updating will likely require an additional layer or two of logic, depending upon the structure of the registers.

Figure 8:
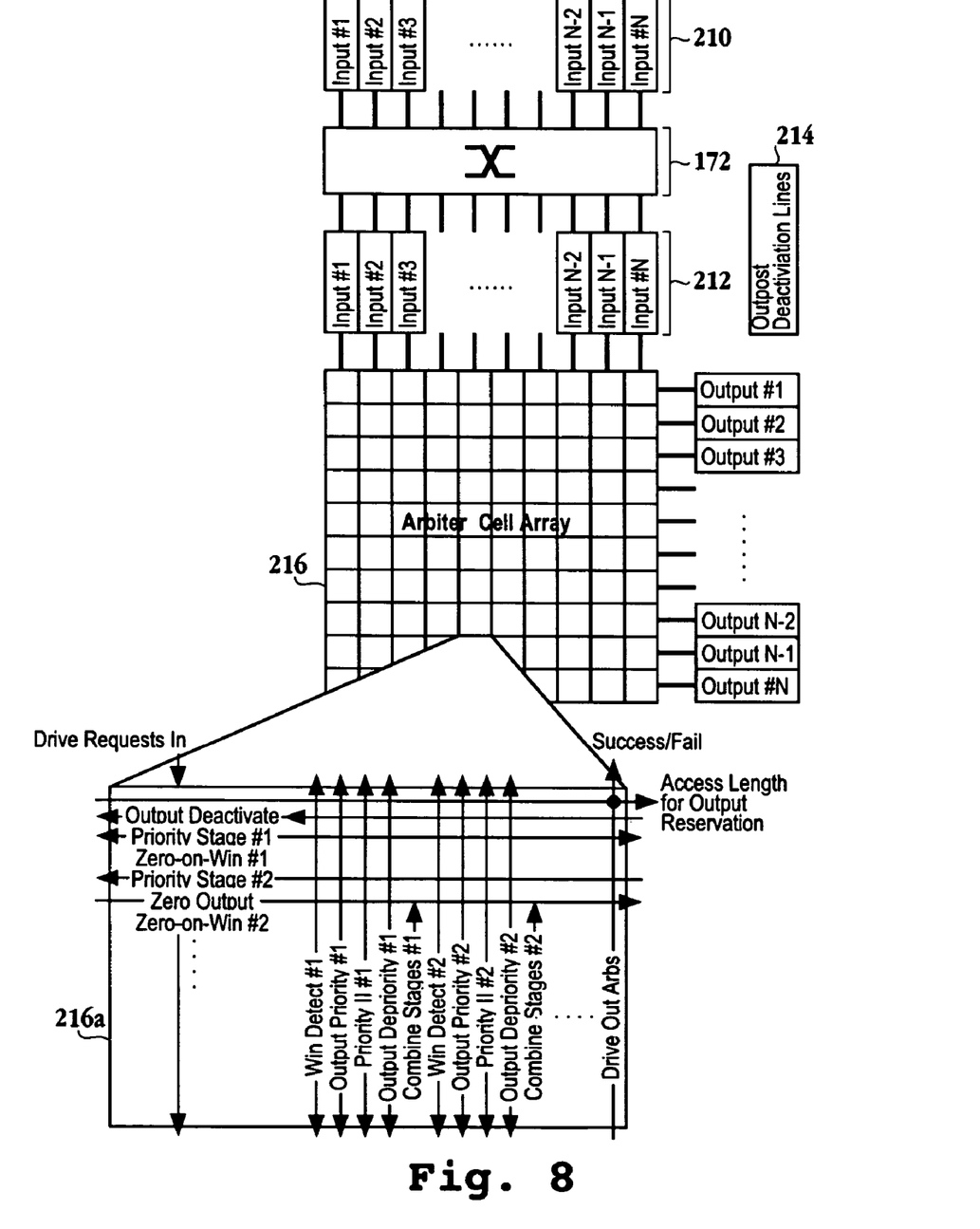
FIG. 8 is a simplified schematic diagram illustrating an exemplary layout for the logic enabling the arbitration functionality in very large scale integration (VLSI) in accordance with one embodiment of the invention.

FIG. 8 is a simplified schematic diagram illustrating an exemplary layout for the logic enabling the arbitration functionality in very large scale integration (VLSI) in accordance with one embodiment of the invention. The arbitration control registers, which include the fixed part 210 and the rotating part 212, and input prioritization shifters 172 are located at the top edge of the arbiter. Controllers for the output deactivation lines 214 are located down the side of the arbiter. Between the input and output controllers, a grid of arbiter cells 216 which contains the gates at the heart of the arbiter. A single cell 216-a has been expanded to show the complex layout of gates within it. On the left side of cell 216-a, the request-selection section contains gates to perform steps 3, 4, and 6 listed above with reference to FIGS. 5A and 5B. The priority encoders in step 3 stretch clear across the array, horizontally, and will therefore require a hierarchy of small gates to make each encoder. It should be noted that the large gates that span the array are indicated as horizontal lines with an arrow attached to one end. The logic for steps 5 and 7–10 listed above with reference to FIGS. 5A and 5B, is located on the right side of each cell. Except for the OR gates in the stage-combination logic, all of these sets of logic stretch clear across the arbiter array from top to bottom. As a result, their wiring will have to be carefully designed to avoid slowing down the arbiter. It should be appreciated that the stage-combination logic output must be driven horizontally across the entire cell array. Finally, the success or failure (and length, for multi-cycle arbitrations) of individual arbitrations must be driven back out to the input and output controllers.

In order to allow input prioritization without an arbiter cycle-time impact, the input control register portion of FIG. 8 shows how the prioritization barrel shifter could be "pushed out" from the critical path of the arbiter. Instead of having a single collection of arbitration control registers assigned to each input, the arbitration control registers are split into two portions for each input. The actual sets of control registers 210 are fixed, and are permanently assigned on an input-by-input basis. Registers 210 are located before the prioritization barrel shifter/unshifter. In addition, each input has a smaller set of registers that hold just enough information to take output from the arbiter and launch off the next cycle's arbitration. These registers rotate around in a continuous loop so that they match the priority adjustment at all times, and are therefore "pre-shifted." As a result, the shifter just connects the appropriate "fixed" and "rotating" register sets so that they can communicate at all times. In one embodiment, the arbiter is configured so that all control registers are rotating, so the shifter directly connects input units to the rotating control register sets. The final decision on where to put the shifter will have to be made after the timing of the input unit, crossbar links, the shifter, arbitration control registers, and the arbiter itself have been determined more precisely.

The output deactivation logic enables each output to deactivate itself, using a "bank deactivation" AND gate to nullify all requests coming into the bank for a cycle. These deactivations can occur for many different reasons. If the output is to a cache bank, it will need to occasionally deactivate its input to allow data from main memory to be brought into the cache. If the output is to a reference buffer, then it will have to deactivate itself whenever there is a danger of buffer overflowing. This means that the buffer must proactively "turn off" its input when it has N buffers remaining if it takes N cycles to cut off the input. Any output may need to be disabled for one or more cycles following a multi-cycle reservation (for a LD/ST synchronization reference or an instruction cache fetch). This last case requires that the bank-control logic be designed so that it can force bank deactivation on any cycle immediately following a multi-cycle arbitration. Because of this short feedback loop, the logic is designed to keep out of the critical path of the arbitration cycle. This also requires that each arbitration request going into the cell grid be more than a simple 1-bit value. Instead, each request must contain the length of the request, so that the length of the winning request may be forwarded to the bank control logic for reservation purposes, while the input is notified about the success of the request.

The opposite design extreme to the parallel check architecture is to perform all output arbitrations completely in series, instead of trying to speed things up by performing them in parallel. This allows the second part of the parallel arbitration (arbitrating among multiple simultaneous output grants) to be eliminated, since multiple grants will never occur. This results in the following steps for the algorithm referred to as 2-D priority encoding:

1. Input units send a bitvector signaling all arbitrations that they would like to perform this cycle into the arbiter.
2. The arbiter prioritizes the inputs so that each input has a varying priority to all of the different outputs. This priority should be dynamically changed over time so that each input will have varying priority to any particular output, thereby making it difficult for anyone input to hog access to one output.
3. The arbiter prioritizes the outputs so that different outputs will be arbitrated for "first" during each cycle. This limits the possibility for an input to get "stuck" sending references continuously to one output while references to other outputs from that input are forced to wait. This can be done in parallel with step 2.
4. An output selects an input to access it.
5. All pending requests from the successful input (if any) are deactivated.
6. Repeat steps 4–5 for all other outputs.
7. Data rearrangement from the prioritization in step 3 must be undone.
8. Data rearrangement from the prioritization in step 2 must be undone. This can be done in parallel with step 7.

Figure 9A:
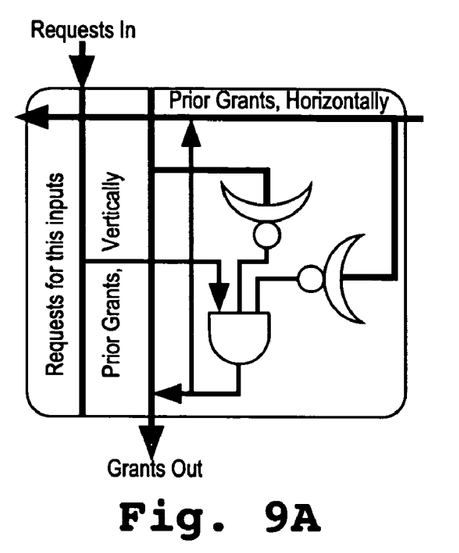
FIGS. 9A and 9B illustrate individual cells of a 2 dimensional priority encoder architecture using full look-ahead logic in accordance with one embodiment of the invention.
Figure 9B:
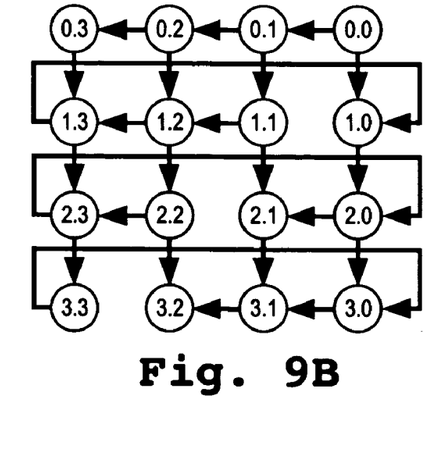

By eliminating the second half of each priority stage and the multiple, fully parallel sets of priority encoders, the amount of hardware required is reduced to the point that optimization of the entire encoder as a single, large 2-D structure performing steps 4–6 is now possible. FIGS. 9A and 9B illustrate how the individual cells of this large structure would be built using full look-ahead logic in accordance with one embodiment of the invention. It should be appreciated that priority encoding by ripple carry or with full look ahead is well known by one skilled in the art.

Figure 10A:
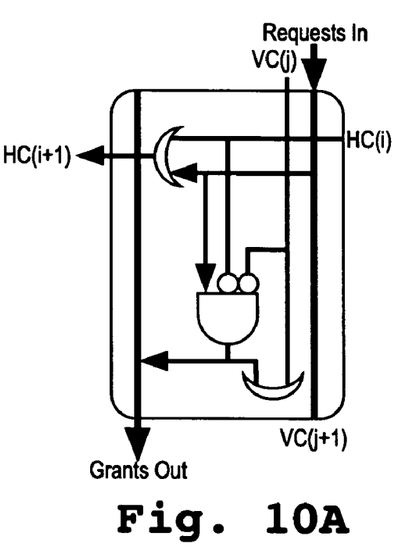
FIGS. 10A and 10B illustrate individual cells of a 2 dimensional priority encoder architecture using ripple-only logic in accordance with one embodiment of the invention.
Figure 10B:
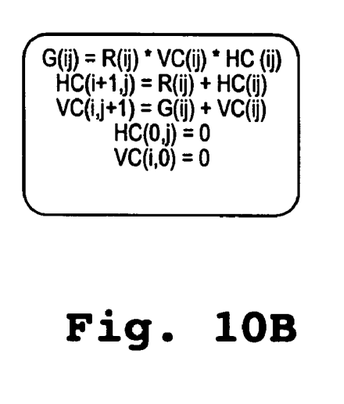

FIGS. 10A and 10B illustrate how the individual cells of this large structure would be built using ripple-only logic in accordance with one embodiment of the invention.

It will be apparent to one skilled in the art that a combination of the schemes illustrated by FIGS. 9A, 9B, 10A, and 10B may be developed by combining some of the features of these two extremes. Outside of the basic 2-D priority encoder, both prioritization shifters can be pulled outside of the array and primary arbitration feedback loop, instead of just the input ones.

Overall, this kind of design is simpler and easier to understand and optimize relative to the parallel-check architecture. However, the 2-D priority encoder architecture is not scalable, and is therefore an all-or-nothing proposition. Unlike the parallel-check system, the "optimal" arbitration will always be found on each cycle, but one must wait for it to be found. As a result, the parallel check system will probably be the preferable design to use unless the 2-D encoder can be very highly optimized or a large number of parallel-check stages (more than 2–3) are required to pack in the requests efficiently enough.

In summary, the above described embodiments provide exemplary arbitration techniques and architecture schemes for the arbitration techniques for multi-thread multi-core processors. The parallel-check arbitration scheme and architecture scheme is more complex but scalable. The 2 dimensional priority encoder arbitration scheme and architecture is simpler than the parallel-check technique but not scalable.

Furthermore, the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for arbitrating requests in a multi-core multi-thread processor, comprising:
   issuing a signal indicating arbitration requests to be performed during a cycle for a respective input unit;
   prioritizing the signal from the respective input unit relative to additional signals for arbitration requests during the cycle from additional input units;

in parallel with the prioritizing, associating one of a plurality of outputs with the respective input unit for one of the arbitration requests, the associating including,
  determining if the one of the plurality of outputs was previously allocated; and
  if the one of the plurality of outputs was previously allocated, the method includes nullifying the association of the one of the plurality of outputs with the respective input;
repeating the associating for remaining arbitration requests;
identifying granted arbitration requests for the respective input unit;
selecting one of the granted arbitration requests; and
de-prioritizing the signal from the respective input unit relative to additional signals from the additional input units.

2. The method of claim 1, wherein the method operation of associating one of the plurality of outputs with the respective input unit for one of the arbitration requests includes,
  prioritizing each of the plurality of outputs relative to all of the input units.

3. The method of claim 1, wherein the method operation of identifying granted arbitration requests for the respective input unit includes,
  disabling future requests from the respective input unit.

4. The method of claim 1, wherein the method operation of prioritizing the signal from the respective input unit relative to additional signals for arbitration requests during the cycle from additional input units includes,
  rotating the requests through a barrel shifter.

5. The method of claim 1, wherein the method operation of identifying granted arbitration requests for the respective input unit includes,
  detecting the granted arbitration requests through an OR gate.

6. The method of claim 2, further comprising:
  after selecting the one of the granted arbitration request, the method includes,
    de-prioritizing each of the plurality of outputs relative to all of the input units.

7. The method of claim 3, wherein the method operation of disabling future requests from the respective input unit includes,
  updating contents of a register associated with the respective input unit.

8. A processor chip, comprising:
  a plurality of processing cores, each of the processing cores being multi-threaded;
  a plurality of cache bank memories; and
  a crossbar enabling communication between the plurality of processing cores and the plurality of cache bank memories, the crossbar including an arbiter configured to arbitrate multiple requests received from the plurality of processing cores with available outputs, the arbiter including,
    a barrel shifter configured to rotate the multiple requests for dynamic prioritization;
    priority encoders associated with each of the available outputs, each of the priority encoders having logic gates configured to disable priority encoder outputs, wherein the processor chip further includes arbitration control registers configured to provide the multiple requests to the arbiter, the arbitration control registers include a first portion of control registers and a second portion of control registers, the first portion located upstream from the barrel shifter, the first portion of control registers being assigned to an input source.

9. The processor chip of claim 8, wherein the second portion of control registers are located downstream from the barrel shifter, the second portion of control registers configured to rotate to match priority adjustments.

10. The processor chip of claim 8, wherein the arbiter further comprises:
  output deactivation logic configured to nullify incoming requests.

11. The processor chip of claim 9, wherein the barrel shifter is further configured to connect the first portion of control registers to corresponding second portions of the control registers.

12. The processor chip of claim 10, wherein the output deactivation logic includes an AND gate.

13. A server, comprising:
  an application processor chip, the application processor chip, including:
    a plurality of processing cores, each of the processing cores being multi-threaded;
    a plurality of cache bank memories; and
    a crossbar enabling communication between the plurality of processing cores and the plurality of cache bank memories, the crossbar including an arbiter configured to arbitrate multiple requests received from the plurality of processing cores with available outputs, the arbiter including,
      a barrel shifter configured to rotate the multiple requests for dynamic prioritization;
      priority encoders associated with each of the available outputs, each of the priority encoders having logic gates configured to disable priority encoder outputs, wherein the application processor chip further includes arbitration control registers configured to provide the multiple requests to the arbiter, the arbitration control registers include a first portion of control registers and a second portion of control registers, the first portion located upstream from the barrel shifter, the first portion of control registers being assigned to an input source, the second portion of control registers are located downstream from the barrel shifter.

14. The server of claim 13, wherein the second portion of control registers are configured to rotate to match priority adjustments.

15. The server of claim 13, wherein the arbiter further comprises:
  output deactivation logic configured to nullify incoming requests.

16. The server of claim 14, wherein the barrel shifter is further configured to connect the first portion of control registers to corresponding second portions of the control registers.

17. The server of claim 15, wherein the output deactivation logic includes an AND gate.

* * * * *